United States Patent
De Koning et al.

(10) Patent No.: US 8,026,695 B2
(45) Date of Patent: Sep. 27, 2011

(54) BATTERY POWER MANAGEMENT IN OVER-DISCHARGE SITUATION

(75) Inventors: Lambertus Franciscus Maria De Koning, Wijchen (NL); Eddy Aziz, Malden (NL)

(73) Assignee: NXP B.V., Eindhoven (NL)

( * ) Notice: Subject to any disclaimer, the term of this patent is extended or adjusted under 35 U.S.C. 154(b) by 410 days.

(21) Appl. No.: 11/914,354

(22) PCT Filed: May 1, 2006

(86) PCT No.: PCT/IB2006/051351
§ 371 (c)(1),
(2), (4) Date: Nov. 13, 2007

(87) PCT Pub. No.: WO2006/120602
PCT Pub. Date: Nov. 16, 2006

(65) Prior Publication Data
US 2008/0218918 A1  Sep. 11, 2008

(30) Foreign Application Priority Data
May 13, 2005  (EP) ..................................... 05104020

(51) Int. Cl.
*H02J 7/00* (2006.01)
(52) U.S. Cl. ....................................... 320/134; 320/158
(58) Field of Classification Search .................. 320/114, 320/128, 157, 158, 162, 163; 361/56
See application file for complete search history.

(56) References Cited

U.S. PATENT DOCUMENTS

| | | | |
|---|---|---|---|
| 6,222,346 B1 | 4/2001 | Mori | |
| 6,268,710 B1 * | 7/2001 | Koga | ............................ 320/116 |
| 6,313,610 B1 | 11/2001 | Korsunsky | |
| 6,340,880 B1 | 1/2002 | Higashijima et al. | |
| 2003/0096158 A1 | 5/2003 | Takano et al. | |
| 2005/0077878 A1 | 4/2005 | Carrier et al. | |
| 2005/0140334 A1 * | 6/2005 | Tamai et al. | .................. 320/116 |

FOREIGN PATENT DOCUMENTS
EP   1531535 A2   5/2005
* cited by examiner

*Primary Examiner* — Edward Tso
*Assistant Examiner* — Aaron Piggush

(57) ABSTRACT

A method of operating battery power management unit (PMU) in over-discharge situation is disclosed. Furthermore, a power management unit (PMU) and a device comprising a power management unit (PMU) are disclosed. The power management unit (PMU) is part of a system, comprising a battery and a safety circuit connected to the battery. The state of the safety circuit of the battery is determined and the on/off control of the device is made inactive while the safety circuit remains active. Thereby avoiding an application run on the device to go into an active state, i.e. to be turned on, at a moment when the battery has not returned to its normal operation mode.

19 Claims, 3 Drawing Sheets

BATTERY POWER MANAGEMENT IN OVER-DISCHARGE SITUATION

FIELD OF THE INVENTION

The invention relates to a battery power management unit (PMU), and in particular to the operation of a power management unit in an over-discharge situation.

BACKGROUND OF THE INVENTION

Batteries for handheld applications like mobile phones have a built-in safety circuit, which protects the battery from over-charge and over-discharge. When the safety circuit has been activated by over-discharge, the built-in series switch is opened. As a consequence, the battery can only be charged. Only when the battery is recharged again to a sufficiently high voltage the safety resets to normal state again. A difficulty occurs when the application goes to an active state, i.e. turned on, at a moment when the battery has not returned to its normal operation mode. The buffering capacity of the battery to supply switch-on inrush currents is then not available. As a consequence the jump to active state fails, and the application cannot be used.

SUMMARY OF THE INVENTION

The present invention seeks to provide an improved method and system for operating a power management unit. The invention is defined by the independent claims.

The inventors of the present invention have realized that problems may arise when mobile phone manufacturers apply newly developed battery packs that have a higher voltage level to reset from safety mode than the original battery.

In a preferred embodiment, it is first detected that the device is in an off-state. If the device is connected to a charger in the off-state, the power management unit may be in an active state or in an inactive state. A power management unit has a predefined battery voltage monitor level (Vbvm). The power management unit will switch to active state when the actual battery voltage exceeds Vbvm. A power management unit also has a preset reset voltage level to indicate when the power management unit should to reset from safety mode. The power management unit controls the battery charging, while the battery is charged, its voltage (Vbat) will rise.

The invention according to a preferred embodiment is particularly but not exclusively advantageous since the invention will solve problems arises when mobile phone manufacturers apply newly developed battery packs which have a high voltage level to reset from safety mode (Vreset), and the invention thereby ensures stable system start-up, also in such situations.

Additional advantages of embodiments include that the invention may be implemented using only a small amount of (internal) components in addition to the normal charging circuitry, no additional external components are required. The fact that there is no need for additional external components is important, since external components add to the cost and requires physical space. Moreover, the method is robust with respect to operation of the device, since it works only when the safety switch is really open. It does not influence the normal operation. Furthermore, since the method provides the information about the battery state, the battery state can be reported to the user, e.g. to convey the information that the charging of a battery with open switch will take longer than usual. It is a further advantage that the method applies to safety circuits of any kind, irrespective of specific parameters set in the safety circuit, and that the method works independently of the actual Vreset of the specific battery type.

The optional features as defined in dependent claims describe advantageous embodiments of the present invention.

According to other aspects of the invention is provided a battery power management unit and a device comprising a power management unit, where the method of the first aspect is implemented so that the power management unit operates accordingly. In general the various aspects of the invention may be combined and coupled in any way possible within the scope of the invention.

These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF PREFERRED EMBODIMENTS

The invention describes an easy way to detect and monitor the safety switch state while charging mobile electrical devices, such as mobile phones, digital cameras, mobile audio/video applications, etc. The safety switch state information is used to render inactive the on/off control of the device while the safety circuit remains active. An important aspect in this respect is to know that the safety switch is open and when it closes again. The invention will cause the power management unit (PMU) to test regularly the state of the switch. As long as the switch is detected to be open, the power management unit will be inhibited to go to active state.

In the case where the safety switch inside the battery pack is open AND a preset reset voltage Vreset is higher than a predefined battery voltage monitor level Vbvm, the power management unit's attempt to switch to active will fail, because of the large inrush currents that flow for a short moment. This causes a steep dropping of the battery voltage Vbat, and the system returns to the standby state. The charging process resumes, until Vbat reaches Vbvm again. Then the attempt to go to active will start again. This situation repeats itself endlessly. Under conditions where the safety switch is closed, the inrush currents are supplied from the battery and no problem occurs.

Figure 1:
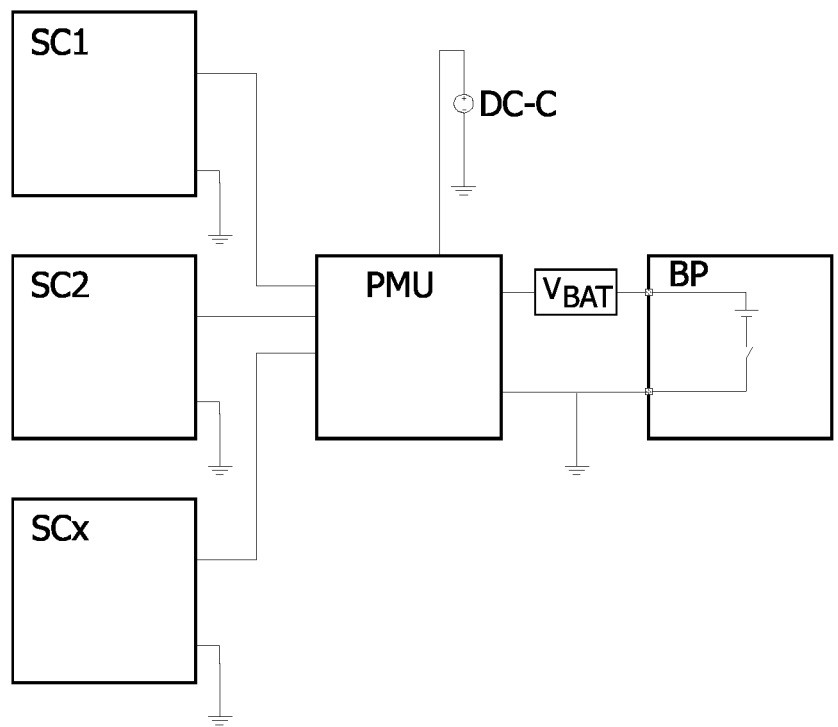
FIG. 1 illustrates a general system set-up, in which the power management unit of the present invention may be applied.

FIG. 1 illustrates a general system set-up, in which the power management unit of the present invention may be applied. The power management unit PMU is connected to the battery pack BP. The power management unit is also connected to a number of systems chips SC1, SC2, SCx. In a charging situation the battery pack is connected to the DC charger DC-C through the power management unit PMU. A switch internal in the power management unit controls the on/off and the value of the charging current. The power management unit and the system chips are normally on the same printed circuit board and cannot be separated. The battery pack and wall plug (charger plug) can be taken off the device.

Figure 2:
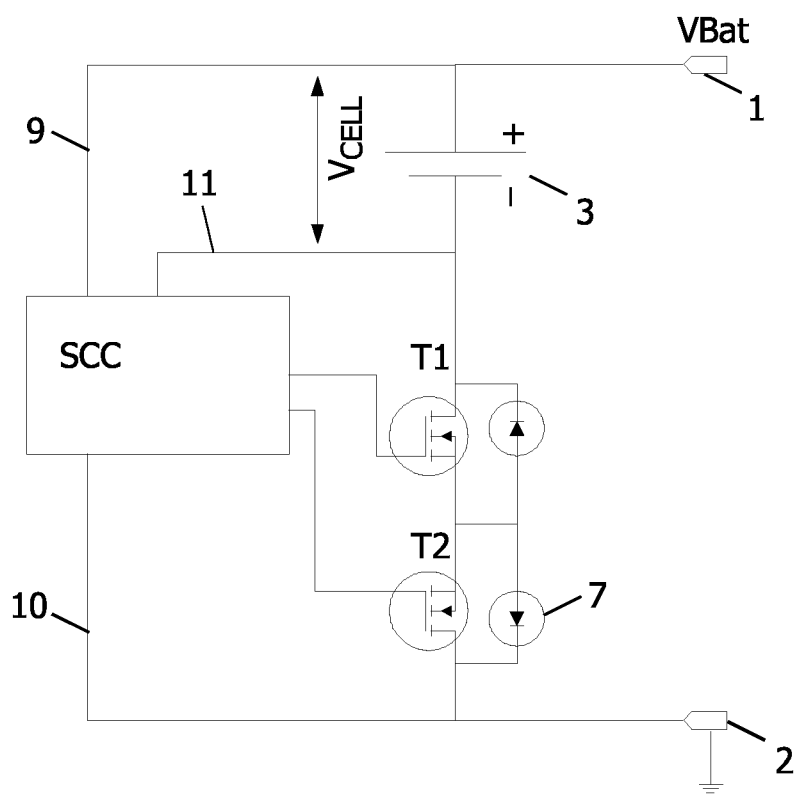
FIG. 2 illustrates an embodiment of a commonly used protection diagram for use in a power management unit.

In FIG. 2 is illustrated an embodiment of a commonly used protection diagram for use together with a power management unit, the diagram showing the safety circuit around the battery 3. A power management unit is a one-chip device comprising several blocks and physically separated from the battery 3. The battery 3 is, together with the safety circuit, one physical, sealed unit, that may be connected to the intended application, i.e. to the device.

The protection circuit comprises terminals 1, 2 through which a load may be connected to the battery 3. A safety control circuit SCC is connected via lines 9, 10 to the terminals 1, 2 so that it may monitor the voltage difference between the terminals. The safety control circuit SCC is also connected via lines 9, 11 to the battery 3 so that it may monitor the voltage difference Vcell across the battery 3. The safety control circuit SCC controls the state of switches T1, T2.

The function of the switch T1 is to protect against overcharge, whereas the function of the switch T2 is to protect against over-discharge. When one of the switches T1, T2 is in a non-conducting state (i.e. the switch is open), normal operation is inhibited, in this situation the safety circuit is active. The safety circuit is 'reset' or in 'normal mode' when both of the switches are in conducting state (i.e. the switches are closed). When the switch T2 is in a non-conducting state, its parasitic diode 7 enables charging the battery. As a consequence the terminal voltage Vbat is ~0.6 V higher than the cell voltage Vcell. The 0.6 V being a property given by the physics of nature and is typical for the Silicon material used in semiconductor devices. The switches T1 and T2 may be integrated in the protection circuit.

Typical parameter ranges for the over-discharge protection function for batteries of the Lithium-ion cells type are:

| Vopen | Cell voltage where T2 opens | 2-3 V |
|---|---|---|
| Vclose | Cell voltage difference where T2 closes again | 0-0.7 V |
| Vreset | Terminal voltage where T2 closes again | 2.6-4.3 V |

The battery pack is sealed without direct access to the state of the safety circuit.

Figure 3:
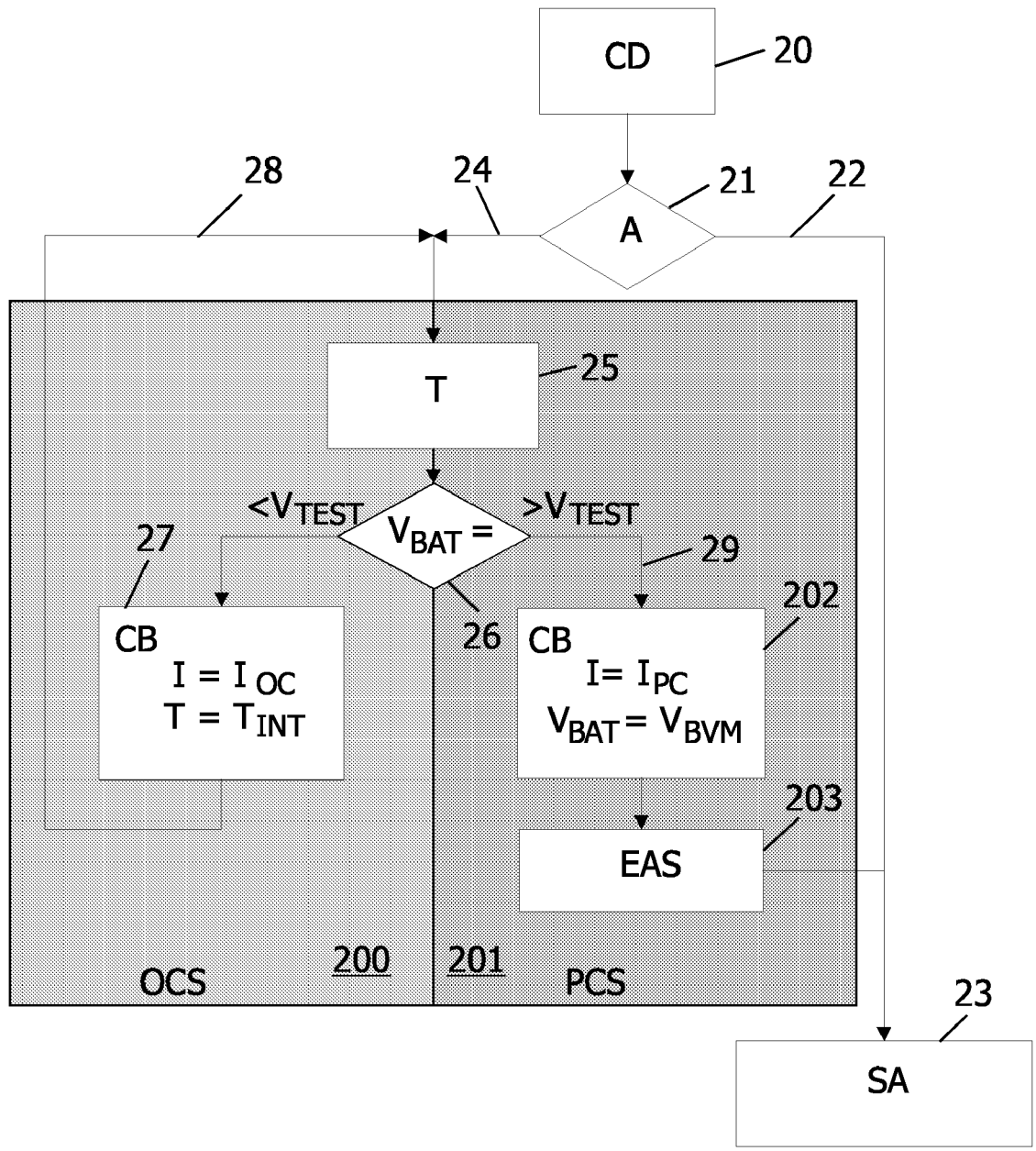
FIG. 3 illustrates a flow diagram of an embodiment of the present invention, and FIG. 4 schematically illustrates an example of the time development of the battery voltage during a charge cycle.

FIG. 3 illustrates a flow diagram of an embodiment operating a power management unit in an over-discharge situation where the state of the safety circuit is determined, and thereby circumventing the direct access to the state of the safety circuit. FIG. 3 illustrates a situation where the charging of the battery is controlled in relation to the on/off control of the device.

The charge control is initiated by detecting that a battery charger is connected in step 20, while the system is in standby state (which is the off-state for the end-user).

The state of the power management unit is determined in step 21, i.e. the state of the safety circuit of the battery is detected. If the power management unit is active, line 22 is followed, the system may be made active in step 23, i.e. the system may be turned on by a user, if desirable. Thus, the on/off control is enabled and the system fully controls the charging process.

However, if the power management unit is inactive, line 24 is followed, and the battery condition is tested in step 25. The test consists of:

Temporarily stopping the charge process for a short time (Ttest)
Load the battery with a test current (Itest)
Check Vbat against a fixed test voltage (Vtest)

The voltage across the battery terminals 1,2 is monitored and compared in choice step 26 to the test voltage. If Vbat is smaller than the test voltage, this is a direct indication that the safety switch T2 is open and the system is set in open-charge state 200.

In the charge battery step 27, the battery is charged with a controlled charge current (Ioc) for a preset time Tint. The method works independently of a given charge current, and a given charge current can be selected if required. After a preset time period, the state of the safety circuit is retested after following line 28. Thus, the battery condition is tested in step 25 by comparing the voltage across the battery terminals 1,2 resulting after the charging of the battery, to the test voltage. In a different embodiment may the battery condition test be performed after the charge battery step CB 27.

The state of the safety circuit is periodically determined and the charging of the battery is repeated until the battery voltage after the battery condition test is larger than the test voltage Vtest, in which case line 29 is followed. The threshold need not be accurate. An open safety switch will result in Vbat being approximately zero after the condition test. A closed switch will result in a voltage larger than Vtest after the condition test. The test voltage is usually 2.2 V or greater for Lithium-ion cells. In the case with Vbat>Vtest the system enters a pre-charge state 201. A voltage Vbat>Vtest is a direct indication of that the safety switch T2 is closed, thus the open charge state 200 can only be left when the test points out that the safety switch is closed.

In the pre-charge state 201, the battery is charged with a specified current Ipc until the voltage between the battery terminals have reached a predefined battery voltage monitor level Vbvm in step 202. When Vbat is equal to Vbvm, the power management unit enters the active state 203, and the system may be made active, i.e. the on/off control is enabled 23.

Figure 4:
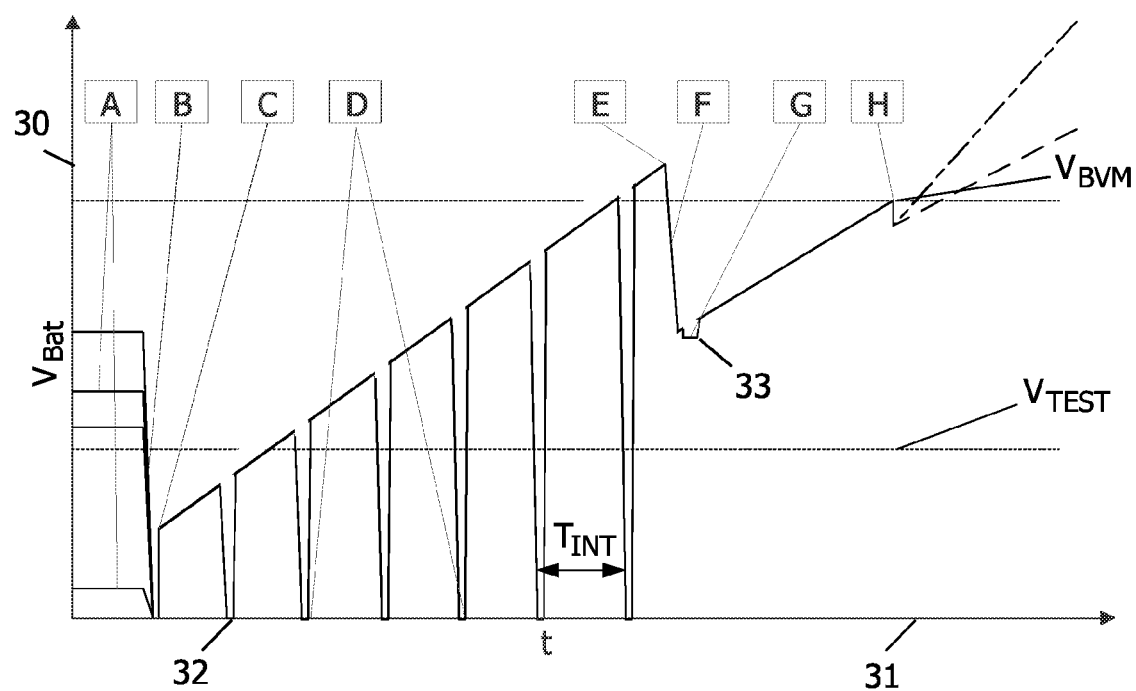

FIG. 4 schematically illustrates an example of the time development of the battery voltage Vbat during a charge cycle, assuming the safety switch is open at the start, i.e. in an over-discharge situation. The voltage, Vbat, across the battery terminals 1, 2 is indicated along the y-axis 30, whereas the x-axis 31 indicates a time axis, t.

The development of the battery voltage is explained in connection a sequence of eight occurrences A-H:

A) The actual battery voltage Vbat before the connection of the charger is usually 0 V when the safety switch is open. The battery voltage is not necessarily actively pulled to 0 V. Depending on the history it may be floating.

B) The charger is connected 20. The battery condition test 25 will bring Vbat to 0 V.

C) The battery is charged in a charging step 27 and the battery voltage rises. Subsequently the battery condition is tested anew. During the battery condition test, the charging is stopped for a short time and a small load is connected to the battery. Since the switch T2 is open, the load drives the voltage to zero 32 and the charging of the battery continues 27. Initial voltage will be the cell voltage in the battery, plus the voltage of the forward biased diode 7.

D) As long as the battery voltage after a battery condition test remains below Vtest, the tests 25 is repeated periodically 28 with a time interval of Tint.

E) When the battery voltage Vbat reaches the voltage Vreset, the safety switch T2 is closed.

F) As a consequence of the closing of the switch T2, the voltage Vbat drops with ~0.6 V.

G) Since the switch T2 is closed the battery voltage hardly drops. The battery cell 3 is now able to deliver the current Itest, and consequently Vbat remains higher than Vtest 33. This test is the last battery condition test, which initiates the pre-charge state.

H) The Vbvm level is reached and the system will go to active state. A small dip in Vbat may occur due to the inrush current, but this is delivered from the battery.

Although the present invention has been described in connection with preferred embodiments, it is not intended to be limited to the specific form set forth herein. Rather, the scope of the present invention is limited only by the accompanying claims.

In this description, certain specific details of the disclosed embodiments are set forth for purposes of explanation rather than limitation, so as to provide a clear and thorough understanding of the present invention. However, it should be understood readily by those skilled in this art, that the present invention might be practiced in other embodiments that do not conform exactly to the details set forth herein, without departing from the scope defined by the claims. Further, in this context, and for the purposes of brevity and clarity, detailed descriptions of well-known apparatus, circuits and methodology have been omitted so as to avoid unnecessary detail and possible confusion.

Reference signs are included in the claims, however the inclusion of the reference signs is only for clarity reasons and should not be construed as limiting the scope of the claims. The word "comprising" does not exclude the presence of elements or steps other than those listed in a claim. The word "a" or "an" preceding an element does not exclude the presence of a plurality of such elements. The invention may be implemented by means of hardware comprising several distinct elements, and/or by means of a suitably programmed processor. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. Method of operating a battery power management unit in an over-discharge situation, the power management unit being part of a system, comprising a battery and a safety circuit connected to the battery, the method comprising the steps of:
charging the battery;
detecting an off-state of a device powered by the battery,
detecting a state of the power management unit, and
determining a state of the safety circuit of the battery, wherein the state of the safety circuit is determined by stopping the charging of the battery while the device is turned off and subsequently loading the battery with a test current to obtain a battery voltage while the device is turned off and comparing the battery voltage to a test voltage while the device is turned off, and wherein an on/off control of the device is made inactive while the safety circuit remains active,
wherein the on/off control of the device is maintained inactive such that the device cannot be turned on if the battery voltage is below the test voltage, and wherein the on/off control of the device is made active such that the device can be turned on if the battery voltage is above the test voltage.

2. Method according to claim 1, wherein the test current is provided during a preset time interval.

3. Method according to claim 1, wherein while the safety circuit is in active-state, the state of the safety circuit is periodically determined with a preset time period.

4. Method according to claim 1 wherein the state of the safety circuit is determined to be active, the battery is precharged until a preset level before the system is set in active state.

5. Method according to claim 1, wherein detecting the state of the power management unit comprises detecting the state of the power management unit as being inactive or active, and wherein determining the state of the safety circuit comprises determining the state of the safety circuit as being inactive or active.

6. A battery power management unit electrically connectable with a battery that is being charged and a safety circuit connected to the battery, the power management unit comprising:
an on/off-detector for detecting an off-state of a device powered by the battery, and
a power management unit state detector for detecting a state of the power management unit,
wherein the state of the safety circuit of the battery is determined by stopping the charging of the battery while the device is turned off and subsequently loading the battery with a test current to obtain a battery voltage while the device is turned off and comparing the battery voltage to a test voltage while the device is turned off, and wherein an on/off control of the device is made inactive while the safety circuit remains active, wherein the on/off control of the device is maintained inactive such that the device cannot be turned on if the battery voltage is below the test voltage, and wherein the on/off control of the device is made active such that the device can be turned on if the battery voltage is above the test voltage.

7. A device comprising a battery, a safety circuit connected to the battery, and a battery power management unit as claimed in claim 6 in electrical connection with the battery and the safety circuit.

8. The battery power management unit of claim 6, wherein the power management unit state detector is further configured to detect the state of the power management unit as being inactive or active, and wherein the state of the safety circuit is determined as being inactive or active.

9. Method of operating a battery power management unit in an over-discharge situation, the power management unit being part of a system, comprising a battery and a safety circuit connected to the battery, the method comprising the steps of:
detecting that a battery charger is connected to the battery while a device powered by the battery is turned off;
detecting a state of the power management unit as being inactive or active; and
determining a state of the safety circuit as being inactive or active if the state of the power management unit is detected as being inactive, wherein determining the state of the safety circuit comprises:
stopping a charging of the battery while the device is turned off;
after stopping the charging of the battery, loading the battery with a test current to obtain a battery voltage while the device is turned off; and
comparing the battery voltage to a test voltage while the device is turned off.

10. The method of claim 9 further comprising enabling an on/off control of the device such that the device can be turned on if the state of the power management unit is detected as being active.

11. The method of claim 9 further comprising charging the battery for a preset time period if the battery voltage is smaller than the test voltage.

12. The method of claim 11 further comprising:
   after charging the battery for the preset time period, periodically determining the state of the safety circuit; and
   repeating the charging of the battery until the battery voltage is larger than the test voltage.

13. The method of claim 9, wherein the test voltage is at least 2.2 V.

14. The method of claim 9 further comprising charging the battery for a preset time period before determining the state of the safety circuit.

15. The method of claim 9 further comprising charging the battery until the battery voltage reaches a predefined battery voltage monitor level if the battery voltage is larger than the test voltage.

16. The method of claim 15 further comprising enabling an on/off control of the device such that the device can be turned on if the battery voltage reaches the predefined battery voltage monitor level.

17. The method of claim 15 further comprising switching the state of the power management unit to be active if the battery voltage reaches the predefined battery voltage monitor level.

18. The method of claim 12 further comprising charging the battery until the battery voltage reaches a predefined battery voltage monitor level if the battery voltage is larger than the test voltage.

19. The method of claim 18 further comprising enabling an on/off control of the device such that the device can be turned on if the battery voltage reaches the predefined battery voltage monitor level.

* * * * *